(12) United States Patent
Kuwajima

(10) Patent No.: US 8,959,487 B2
(45) Date of Patent: Feb. 17, 2015

(54) METHOD AND APPARATUS FOR JUDGING NECESSITY OF PERFORMING INTEGRATION TEST

(71) Applicant: Denso Corporation, Kariya, Aichi-pref. (JP)

(72) Inventor: Hiroshi Kuwajima, Kariya (JP)

(73) Assignee: Denso Corporation, Kariya (JP)

( * ) Notice: Subject to any disclaimer, the term of this patent is extended or adjusted under 35 U.S.C. 154(b) by 9 days.

(21) Appl. No.: 13/938,518

(22) Filed: Jul. 10, 2013

(65) Prior Publication Data
US 2014/0019938 A1 Jan. 16, 2014

(30) Foreign Application Priority Data

Jul. 11, 2012 (JP) ................... 2012-155749

(51) Int. Cl.
*G06F 9/44* (2006.01)
*G06F 11/36* (2006.01)
*G06F 11/30* (2006.01)

(52) U.S. Cl.
CPC .............. *G06F 8/75* (2013.01); *G06F 11/3668* (2013.01); *G06F 11/3688* (2013.01); *G06F 11/30* (2013.01)
USPC ....................................... 717/124

(58) Field of Classification Search
CPC .................................. G06F 11/3668
USPC ....................................... 717/124
See application file for complete search history.

(56) References Cited

U.S. PATENT DOCUMENTS

| | | | |
|---|---|---|---|
| 5,615,333 A * | 3/1997 | Juettner et al. ............. | 714/38.13 |
| 6,769,114 B2 * | 7/2004 | Leung ........................... | 717/124 |
| 7,203,869 B2 * | 4/2007 | Gwak ........................... | 714/46 |
| 2005/0204201 A1 * | 9/2005 | Meenakshisundaram et al. ........................... | 714/38 |

FOREIGN PATENT DOCUMENTS

| | | |
|---|---|---|
| JP | 2009-223856 | 10/2009 |
| JP | 2012-008660 | 1/2012 |
| JP | 2012-088933 | 5/2012 |

OTHER PUBLICATIONS

Lionel Briand et al., "Using Genetic Algorithms and Coupling Measures to Devise Optimal Integration Test Orders", Jul. 2002, SEKE '02 Proceedings of the 14th international conference on Software engineering and knowledge engineering, pp. 43-50.*
Hareton Leung et al., "A Study of Integration Testing and Software Regression at the Integration Level", 1990, IEEE, pp. 290-301.*

(Continued)

*Primary Examiner* — Wei Zhen
*Assistant Examiner* — Lanny Ung
(74) *Attorney, Agent, or Firm* — Harness, Dickey & Pierce, PLC

(57) ABSTRACT

Whether or not an integration test between or among software components is necessary is judged. Corresponding information between features is acquired, which configures a feature model expressing characteristics of a group of products produced by the software product line, and a type and variations of each software component. For each software component, a set of state variables of all of the features corresponding to the software components is produced based on the corresponding information. For each software component, a specific logical formula is produced. Two or more software components are designated. A necessity judgment formula is produced by logical-product combining all the specific judgment formulas, for the software components designated. It is judged that the integration test is necessary when the necessity judgment formula always shows FALSE (inconsistent formula) and not necessary when the necessity judgment formula shows unclearness as to TRUE or FALSE, or always shows TRUE (valid formula).

5 Claims, 6 Drawing Sheets

(56) References Cited

OTHER PUBLICATIONS

Jean Hartmann et al., "UML-Based integration testing", 2000, Proceeding ISSTA '00 Proceedings of the 2000 ACM SIGSOFT international symposium on Software testing and analysis, pp. 60-70.*

Zhenyi Jin et al., "Integration testing based on software couplings", 1995, pp. 13-23.*

Yoshimura, K. et al, "Introduction of a Software Product Line Into an Embedded System", Information Processing Society of Japan, vol. 50, No. 4; Apr. 2009; pp. 295-302 w/partial translation.

* cited by examiner

FIG.5

| No. | COMBINATION PATTERN (SET) TARGETED TO INTEGRATION TEST | RESULT OF JUDGEMENT | RESULT OF TEST |
|---|---|---|---|
| 0 | {$S_{11}$, $S_{21}$, $S_{31}$, ...} | ○(NECESSARY) | XXXX (RESULT-STORAGE ADDRESS) |
| 1 | {$S_{11}$, $S_{31}$, $S_{41}$, ...} | ×(NOT NECESSARY) | null |
| 2 | {$S_{21}$, $S_{31}$, $S_{51}$, ...} | ○ | XXXX (RESULT-STORAGE ADDRESS) |
| ...... | ...... | ...... | ...... |

FIG.6

| TARGET OF TEST | INVERTED INDEX |
|---|---|
| $S_{11}$ | {0, 1, ⋯} |
| $S_{21}$ | {0, 2, ⋯} |
| $S_{31}$ | {0, 1, 2, ⋯} |
| $S_{41}$ | {1, ⋯} |
| $S_{51}$ | {2, ⋯} |
| ⋮ | ⋮ |

METHOD AND APPARATUS FOR JUDGING NECESSITY OF PERFORMING INTEGRATION TEST

CROSS-REFERENCE TO RELATED APPLICATION

This application is based on and claims the benefit of priority from earlier Japanese Patent Application No. 2012-155749 filed Jul. 11, 2012, the description of which is incorporated herein by reference.

BACKGROUND OF THE INVENTION

1. Technical Field of the Invention

The present invention relates to a method and apparatus for judging the necessity of performing an integration test for software components.

2. Related Art

In order to realize a specific function in machines or devices, a computer system is embedded in these machines or devices. Recently, a wide range of variations of such an embedded computer system is offered for one product line in order to meet users' various requests.

In the development of software of such an embedded computer system, a software product line (SPL) is attracting attention. The SPL is one of development methodologies, in which technology components are systematized for multiple products.

In the SPL, a requested specification is specified according to a feature model that is a data obtained from an analysis of a product. Specifically, the feature model defines a relationship between subdivided individual specifications (also referred to as features) of a product. According to the requested specification defined as mentioned above, core assets (reusable software components) that are available are appropriately combined to produce a specific product (application software). For example, refer to a patent document JP-A-2012-008660, or a non-patent document "Introduction of a Software Product Line in an Embedded System" written by Yoshimura et al., Information Processing, Vol. 50, No. 4, April 2009, pp., 295-302.

In the SPL, a software component provided as a core asset may be used alone or may be used in combination with other software component. In any case, such a core asset is required to be guaranteed to work to specification. For this purpose, it is necessary to perform an integration test in advance between software components.

Let us assume that there are n types of software components and that an integration test is performed for each of all two-component combinations of these n types of software components. In this case, the number of combinations is $_nC_2$. Practically, integration tests (also referred to as link tests) are required to be performed for three-component or more combinations of software components.

Specifically, as the number of software components is increased that is available as core assets, time and effort spent in the integration tests is significantly increased. Therefore, in practice, some measures may have to be taken against such a problem. For example, the integration test may be omitted for a combination of software components that would never be concurrently selected. However, if the necessity of performing an integration test is checked for each of combinations of software components when there are a tremendous number of such combinations, the labor of a worker will not be mitigated but, on the contrary, may be increased.

SUMMARY OF THE INVENTION

Therefore it is desired to mitigate the labor involved in integration tests of software components that are provided as core assets in a software product line.

As exemplary embodiment, there is provided a method of judging the necessity of performing an integration test. In the method, at a first step, corresponding information is acquired that shows correspondence of the features configuring a feature model, with the types and variations of software components. The feature model expresses the characteristics of a group of products, which is manufactured in a software product line.

At a second step, a symbol i (i=1, 2, ... M (M is a total number of types of software components)) indicates the type of a software component, and a symbol j (j=1, 2, ... $N_i$ ($N_i$ is a total number of variations of software components specified by the type i) indicates a variation, and a symbol $S_{ij}$ indicates a software component specified by the type i and the variation j. A state variable is prepared for each feature. The state variable is TRUE when the feature is selected and FALSE when not selected. Using such a state variable, a state variable set $C_{ij}$ is generated for each software component $S_{ij}$, according to the corresponding information acquired at the first step. The state variable set $C_{ij}$ includes the features that all correspond to the software component $S_{ij}$.

At a third step, a symbol $S_{ix}$ indicates a group of software components (component group) specified by the type i and having $N_i$ variations. A symbol t (t≠j) indicates $N_i$–1 variations other than the variation specified by the variation j of the component group $S_{ix}$. All elements in the state variable set $C_{ij}$ are combined by a logical product to obtain a logical formula $H(C_{ij})$. The logical formula $H(C_{ij})$ is logically denied to obtain a logical formula $HN(C_{ij})$. For each software component $S_{ij}$, the logical formula $H(C_{ij})$ and $N_i$–1 logical formulas $HN(C_{it})$ are combined as a logical product to generate a specific judgment formula $IS(C_{ij})$.

The logical formula $H(C_{ij})$ expresses a condition for selecting software components having a variation specified by the variation j in the component group $S_{ix}$ (software components of the same type specified by the type i). The logical formula $NH(C_{ij})$ expresses a condition for not selecting software components specified by the $N_i$–1 variations t in the component group $S_{ix}$ (i.e. software components having variations other than the one specified by the variation j). In other words, the specific judgment formula $IS(C_{ij})$ that is a combination of these logical formulas is obtained by adding a condition for not concurrently selecting two or more variations, i.e. for selecting only one variation, to the condition expressed by the logical formula $H(C_{ij})$.

At a fourth step, two or more software components are designated, which are targeted in a judgment as to the necessity of performing an integration test.

At a fifth step, necessity judgment formulas generated by a specific judgment formula generating means are combined as a logical product, for all the software components designated at the fourth step, thereby generating an integration test necessity judgment formula. When the integration test necessity judgment formula constantly turns to FALSE (inconsistent formula (or constant false formula)), an integration test is judged as not being necessary. When the integration test necessity judgment formula is unclear as to TRUE or FALSE, or constantly turns to TRUE (valid formula (or tautology, constant true formula)), an integration test is judged as being necessary.

Here, the inconsistent formula (or constant false formula) can be referred to as a formula that does not hold (evaluates to false) for any values (assignments) of its variables over 0 and 1, while the valid formula (or tautology, constant true formula) can be referred to as a formula that holds (evaluates to true) for any values (assignments) of its variables over 0 and 1.

According to the method of judging the necessity of performing an integration test of the present invention, a specific judgment formula $IS(C_{ij})$ is prepared for each software component $S_{ij}$. Using the specific judgment formula $IS(C_{ij})$, the necessity of performing an integration test can be easily judged for any combination of software components, without referring to a feature model or the like.

In an apparatus for judging the necessity of performing an integration test of the present invention, a corresponding information acquiring means performs a processing corresponding to the first step. Similarly, a state set generating means performs a processing corresponding to the second step; a specific judgment formula generating means performs a processing corresponding to the third step; a target selecting means performs a processing corresponding to the fourth step; an integration test necessity judging means performs a processing corresponding to the fifth step; and a judgment result outputting means outputs a result of the judgment made by the integration test necessity judging means.

In this way, the apparatus for judging the necessity of performing an integration test of the present invention can enjoy the advantages similar to those obtained by performing the method of judging the necessity of performing an integration test described above.

BRIEF DESCRIPTION OF THE DRAWINGS

In the accompanying drawings:

FIG. 5 is an explanatory diagram illustrating a structure of a judgment result database, according to the embodiment; and FIG. 6 is an explanatory diagram illustrating a structure of a search database, according to the embodiment.

DETAILED DESCRIPTION OF THE PREFERRED EMBODIMENTS

With reference to the accompanying drawings, hereinafter is described an embodiment of the present invention.

Figure 1:
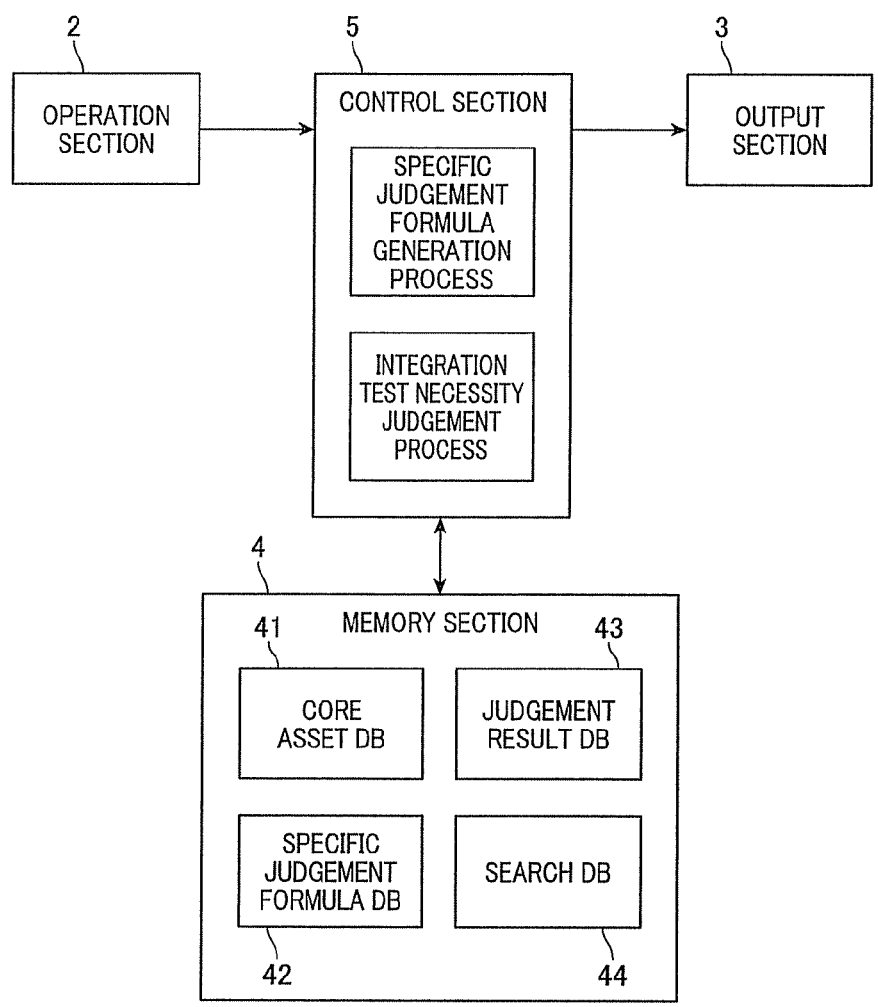
FIG. 1 is a block diagram illustrating a general configuration of an apparatus for judging the necessity of performing an integration test, according to an embodiment of the present invention.

FIG. 1 is a block diagram illustrating a general configuration of an apparatus 1 for judging the necessity of performing an integration test (also referred to as a link test), according to the present embodiment. As shown in FIG. 1, the apparatus 1 includes an operation section 2, an output section 3, a memory section 4 and a control section 5. The operation section 2 is used for inputting various instructions. The output section 3 displays an operation procedure, results of processings, or the like. The memory section 4 stores various data used in a software product line (SPL). The control section 5 carries out processings using the various data stored in the memory section 4, outputs the results of the processings to the output section 3, and stores the same in the memory section 4.

The memory section 4 includes a core asset database 41 (hereinafter, database is indicated as DB), a specific judgment formula DB 42, a judgment result DB 43 and a search DB 44. The core asset DB 41 stores a feature model, reusable software as software components, and corresponding information. The feature model is prepared through an analysis (domain engineering) of a group of products to which the SPL is applied. The corresponding information shows correspondence of the specific features indicated by the feature model, with the software components. The specific judgment formula DB 42 stores specific judgment formulas prepared for the respective software components through a process that will be described later. The judgment result DB 43 stores a combination pattern of the software components subjected to an integration test, the combination pattern corresponding to the result of judgment as to the necessity of performing an integration test for the combination pattern. The search DB 44 stores data used for the search through the judgment result DB 43.

<Feature Model/Software Components>

Figure 2A:
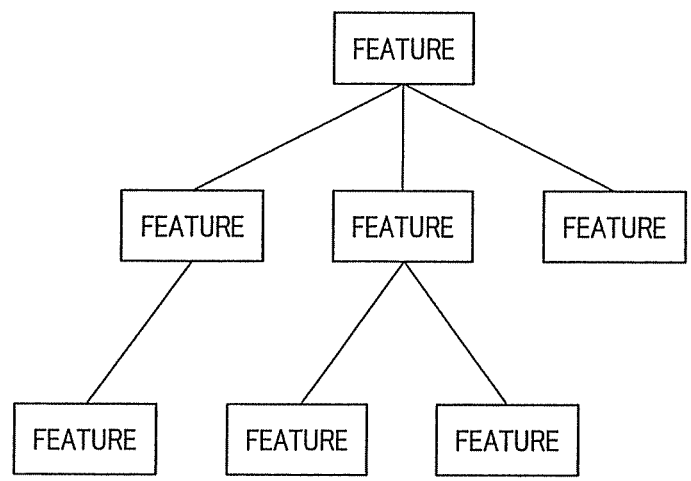
FIG. 2A is an explanatory diagram illustrating a structure of a feature model.

FIG. 2A is an explanatory diagram illustrating a structure of the feature model. As shown in FIG. 2A, a feature model systematically shows a relationship (dependency, alternatives, etc.) between features that correspond to individual specifications (functions, qualities, etc.) extracted as a result of a product analysis.

Figure 2B:
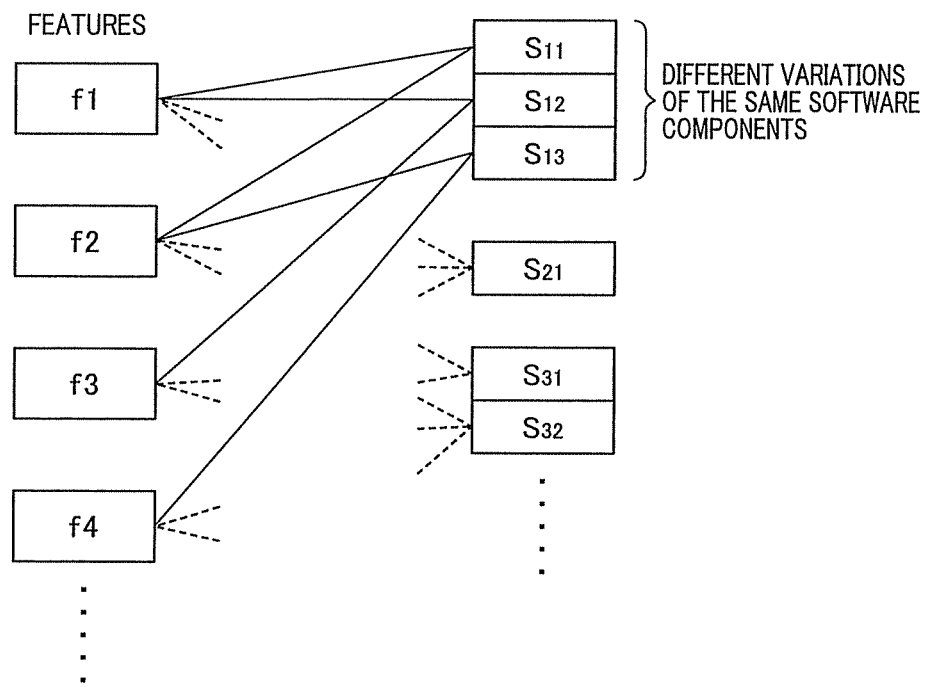
FIG. 2B is an explanatory diagram illustrating corresponding information.

The corresponding information shows correspondence of the specific software components used for realizing a function specified by the features, with specific variations. FIG. 2B is an explanatory diagram illustrating the corresponding information. As shown in FIG. 2B, each feature corresponds to one or more software components. Various types of software components are provided, including those which have several variations depending on the type.

In the following description, a symbol i (i=1, 2, ... M (M is a total number of types of software components)) indicates the type of a software component, a symbol j (j=1, 2, ... $N_i$ ($N_i$ is a total number of variations of software components specified by the type i) indicates a variation, and a symbol $S_{ij}$ indicates a software component specified by the type i and the variation j. Also, a symbol $S_{ix}$ (x=1, 2, ... $N_i$) is used for collectively indicating $N_i$ variations of a software component specified by the type i.

A group of software components include software components that belong to the same type but have different variations. Such software components are mutually exclusive. Thus, a product (application software), which is manufactured in the SPL, uses only one of the variations of the same-type software components.

Specifically, for example, in the SPL that manufactures application software for performing vehicle control, software components of a "wiper motor control" type may be provided. The "wiper motor control" type may be varied as its variations into a "wiper motor control for right-hand steering wheel" type and a "wiper motor control for left-hand steering wheel" type. In such a case, the software components of the "wiper motor control for right-hand steering wheel" type will never be concurrently used with the software components of the "wiper motor control for left-hand steering wheel" type. Thus, the software components of the former and those of the latter are mutually exclusive.

Other examples of the software components can be listed as shown in Table 1 in terms of their types and variations.

TABLE 1

| Type of software component | Variations falling into each designated software component |
|---|---|
| Cruise control for vehicles | For cruise control following a preceding car, which is for high-end cars equipped with a range sensor |
|  | For manual type cruise control for popular cars (cruised speed is constant) |
| Motor control for vehicles | For state-of-the-art electric motors mostly controlled by hardware components, with less software control |
|  | For traditional electric motors controlled by software components |
| Suspension control for vehicles | For suspension control in US (soft sprig control) |
|  | For suspension control in Germany (hard spring control) |
|  | For suspension control in Japan (intermediate spring control) |
| Cooling fan control for machines | For control of high-performance radiators with lower rotation numbers of fan |
|  | For control of popular radiators with higher rotation numbers of fan |
| Engine control for machines | For engine control using sensors produced by "A" company |
|  | For engine control using sensors produced by "B" company |
|  | For engine control using sensors produced by "C" company |

It should be noted that the examples in Table 1 are just for understanding relationships between the type and variations of each software component, and, of course, examples of the software components are not limited to the listed ones.

In the SPL, features are appropriately selected according to the feature model to specify a requested specification. Thus, a product (application software) in conformity with the specified requested specification is produced. The product is configured by the software components corresponding to the selected features (i.e. components specified by the corresponding information).

<Control Section>

The control section 5 is configured by a well-known microcomputer that at least includes CPU, ROM and RAM. The control section 5 at least performs a specific judgment formula generation process and an integration test necessity judgment process. In the specific judgment formula generation process, specific judgment formulas are generated to form the judgment formula DB 42. In the integration test necessity judgment process, each specific judgment formula stored in the judgment formula DB 42 is used to judge the necessity of performing an integration test of the designated software components.

These processes are each started according to an instruction inputted from the operation section.

<<Specific Judgment Formula Generation Process>>

Figure 3:
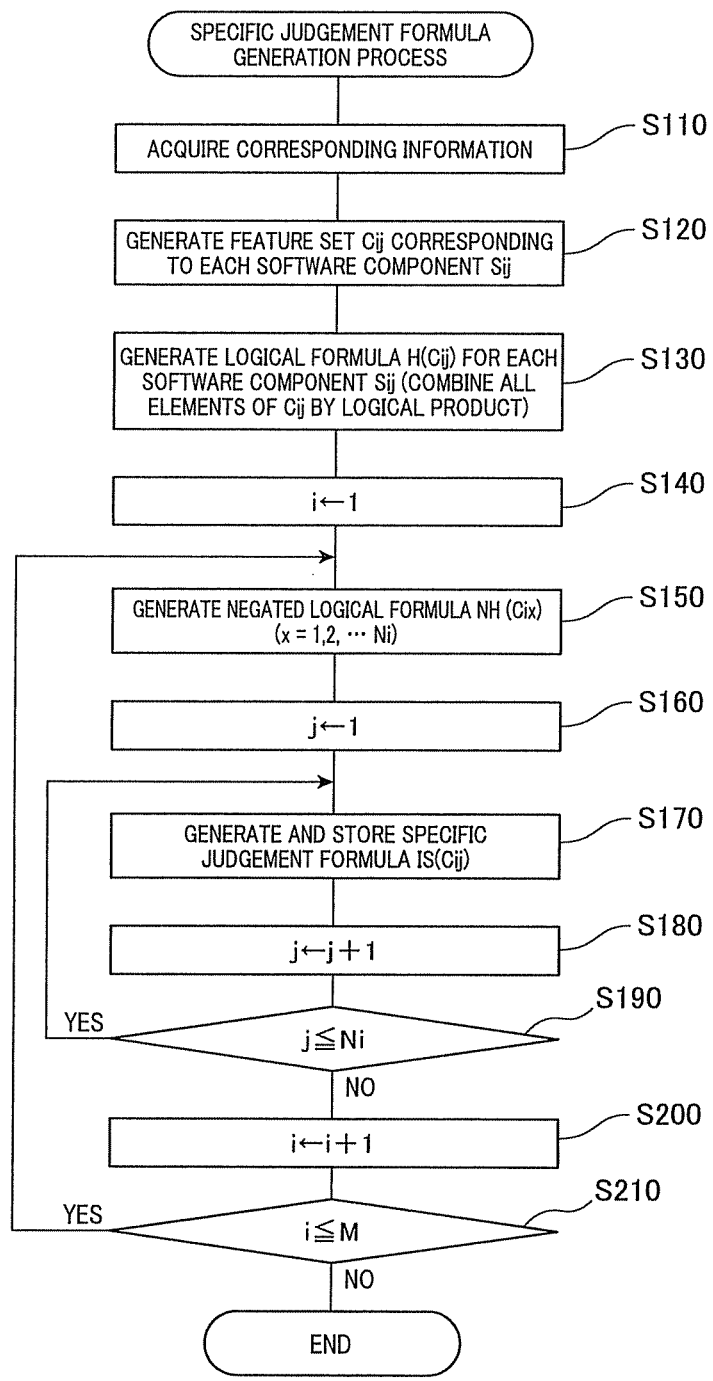
FIG. 3 is a flow diagram illustrating a specific judgment formula generation process, according to the embodiment.

Referring to a flow diagram illustrated in FIG. 3, hereinafter is described a series of steps performed in the specific judgment formula generation process.

When the present process is started, the control section 5 acquires, at step S110, first, corresponding information from the core asset DB 41. Then, at step S120, the control section 5 generates a state variable set $C_{ij}$ for each software component $S_{ij}$ on the basis of the corresponding information acquired at step S110. The state variable set $C_{ij}$ includes all the features that correspond to the software component $S_{ij}$. The state variable of each feature is composed of a boolean variable that is TRUE when the feature is selected and turns to FALSE when not selected.

Then, at step S130, the control section 5 uses the state variable set $C_{ij}$ generated at step S120 to generate a logical formula $H(C_{ij})$ in which all the elements (state variables) of the state variable set $C_{ij}$ are combined by a logical product. In other words, the value of the logical formula $H(C_{ij})$ is TRUE when all the features corresponding to the software component $S_{ij}$ are selected (all the state variables are TRUE).

At step S140, the control section 5 initializes a parameter i to 1 that designates the type of software components. At the subsequent step S150, the control section 5 generates negated logical formulas $NH(C_{ix})$ for the respective $N_i$ software components $S_{ix}$ whose type is specified by the parameter i. The negated logical formulas $NH(C_{ix})$ logically deny the logical formula $H(C_{ix})$ related to the software component.

Then, at step S160, the control section 5 initializes a parameter j to 1 that designates the variation of the software component.

At step S170, the control section combines all of the $N_i-1$ negated logical formulas $H(C_{it})$ (t≠j) among the negated logical formulas $NH(C_{ix})$ generated at step S150, with all of the $N_i$ logical formulas, using a logical product to generate a specific judgment formula $IS(C_{ij})$, and stores the generated formula in the specific judgment formula DB 42.

At step S180, the parameter j is incremented (j=j+1). At the subsequent step S190, the control section 5 determines whether or not the parameter j is equal to or smaller than the total number $N_i$ of variations of the software components $S_{ix}$.

If the parameter j is equal to or smaller than the total number $N_i$, control returns to step S170 to repeat generation of the specific judgment formula $IS(C_{ij})$. If the parameter j is larger than the total number $N_i$, it is regarded that a specific judgment formula has been generated for each of the software components $S_{ix}$ whose type is specified by the parameter i, concerning all of the variations. Then, control proceeds to step S200.

At step S200, the parameter i is incremented (i=i+1). At the subsequent step S210, the control section 5 determines whether or not the parameter i is equal to or smaller than a total number M of the types of the software components.

If the parameter i is equal to or smaller than the total number M, control returns to step S150 to repeat generation of negated logical formulas, generation of specific judgment formulas and storage. If the parameter i is larger than the total number M, it is regarded that generation of a specific judgment formula has been finished for each of all the software components available in the core asset DB 41. Then, the present process is halted until the next iteration.

An example of the specific judgment formula generated in the present process is shown below.

In the example, individual state variables are expressed by symbols f1, f2, . . . . The total number of variations is $N_1=3$, which is of the software components whose type is specified by i=1. Further, the feature set of the software components is expressed by $C_{11}=\{f1, f2\}$, $C_{12}=\{f1, f3\}$ and $C_{ij}=\{f2, f4\}$. Also, in the example, a logical product is indicated by "*" and a logical negation is expressed by "!". Thus, a specific judgment formula $IS(C_{11})$ of a software component $S_{11}$ is expressed by the following Formula (1).

$$IS(C_{11}) = H(C_{11}) * NH(C_{12}) * NH(C_{13}) \quad (1)$$
$$= (f1*f2) *!(f1*f3) *!(f2*f4)$$
$$= f1*f2*!f3*!f4$$

<<Integration Test Necessity Judgment Process>>

Figure 4:
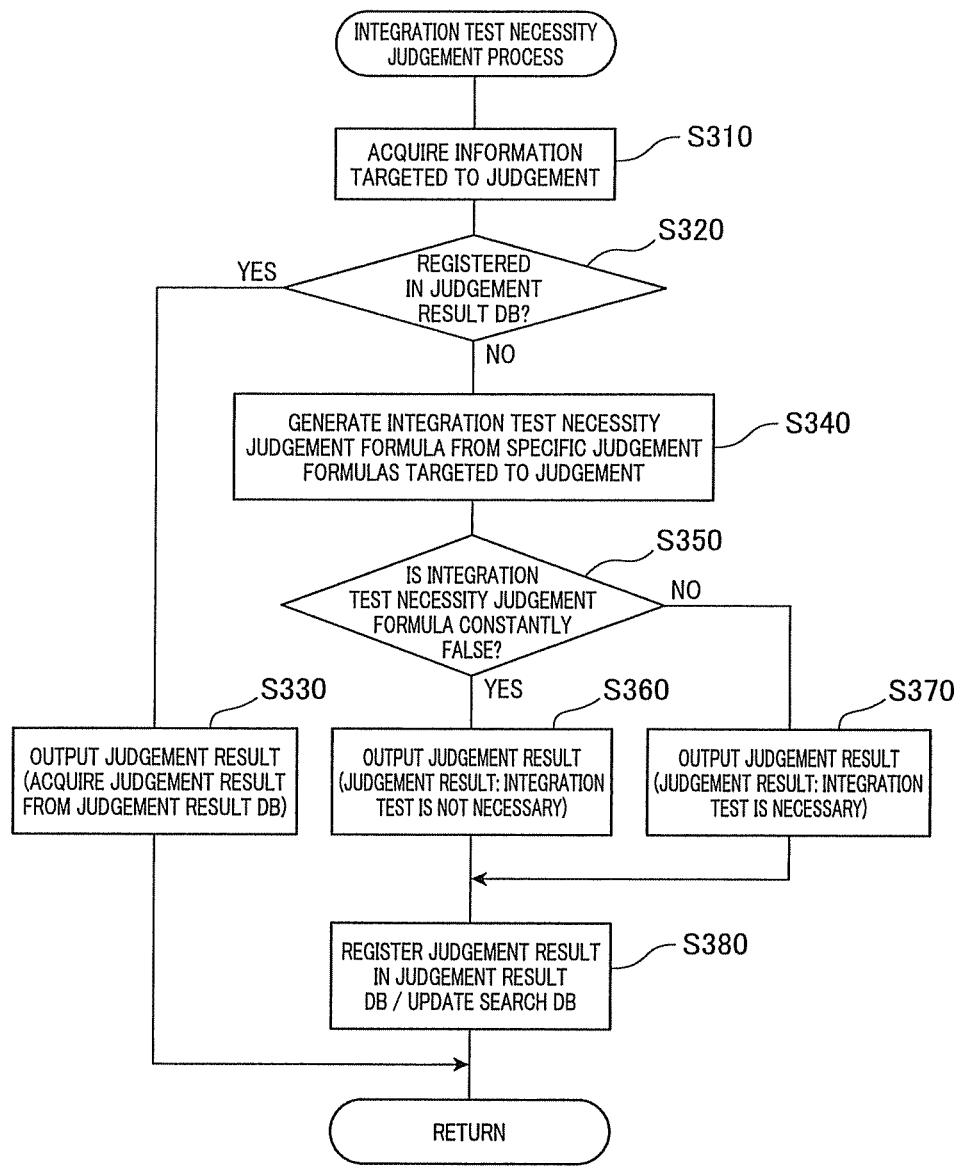
FIG. 4 is a flow diagram illustrating an integration test necessity judgment process, according to the embodiment.

Referring to a flow diagram illustrated in FIG. 4, hereinafter is described the integration test necessity judgment process.

When the present process is started, the control section 5 acquires, at step S310, first, information which is targeted to judgment (hereinafter also referred to as judgment target information). The judgment target information shows a combination of software components targeted to judgment (hereinafter referred to as target combination pattern).

As the judgment target information, the control section 5 may acquire data specified by an operator via the operation section 2, or may sequentially acquire data from a list of judgment target information prepared in advance (stored in the memory section 4 or external memories, not shown).

At step S320, the control section 5 refers to the judgment target information acquired at step S310 and determines whether or not the target combination pattern indicated in the judgment target information is already registered in the judgment result DB 43.

If the target combination pattern is registered in the judgment result DB 43, control proceeds to step S330. At step S330, the control section 5 acquires the judgment result of the target combination pattern and outputs the acquired judgment result, i.e. the judgment as to the necessity of performing an integration test, to the output section 3. Then, the present process is halted until the next iteration.

On the other hand, if the target combination pattern is not registered in the judgment result DB, control proceeds to step S340. At step S340, the control section 5 generates an integration test necessity judgment formula for the target combination pattern. Specifically, the control section 5 acquires, from the specific judgment formula DB 42, the specific judgment formulas of all the software components shown in the target combination pattern. Then, the control section 5 combines all the acquired specific judgment formulas, using a logical product to generate an integration test necessity judgment formula.

At step S350, the control section 5 determines whether or not the value of the integration test necessity judgment formula generated at step S340 is constantly FALSE (inconsistent formula) irrespective of the values of the state variables. If an affirmative determination is made (constantly false), control proceeds to step S360 to output, to the output section 3, a judgment result that an integration test is not required to be performed. Then, control proceeds to step S380.

On the other hand, if a negative determination is made at step S350, i.e. if the integration test necessity judgment formula is unclear as to TRUE or FALSE, or if it is constantly TRUE (valid formula), control proceeds to step S370 to output, to the output section 3, a judgment result that an integration test is required to be performed. Then, control proceeds to step S380.

At step S380, the judgment result obtained at step S360 or S370 is registered in the judgment result DB 43, corresponding to the target combination pattern. At the same time, the control section 5 updates the search DB 44 so that the judgment result of the newly registered target combination pattern can be searched. Then, the present process is halted until the next iteration.

Examples of the integration test necessity judgment formula generated in the present process are shown below.

In the examples, the feature set is expressed by $C_{11}=\{f1, f2\}$, $C_{12}=\{f1, f3\}$, $C_{ij}=\{f2, f4\}$ and $C_{22}=\{f2, f4\}$.

Formula (2) expresses an integration test necessity judgment formula $ITT(C_{11}, C_{21})$ for a combination of software components $S_{11}$ and $S_{21}$. Formula (3) expresses an integration test necessity judgment formula $ITT(C_{12}, C_{21})$ for a combination of software components $S_{12}$ and $S_{21}$.

$$ITT(C_{11},C_{21})=IS(C_{11})*IS(C_{21})=f1*f2*!f3*!f4 \quad (2)$$

$$ITT(C_{12},C_{21})=IS(C_{12})*IS(C_{21})=f1*f3*(!f3+!f2*!f4)*f2*!f4 \quad (3)$$

In Formula (2), the result (TRUE or FALSE) depends on the values of the state variables. Accordingly, the combination of the software components $S_{11}$ and $S_{21}$ is judged as requiring an integration test. On the other hand, Formula (3) that includes (f2*!f2) is constantly FALSE (inconsistent formula) irrespective of the values of the state variables. Accordingly, the combination of the software components $S_{12}$ and $S_{21}$ is judged as not requiring an integration test.

<Judgment Result DB/Search DB>

Hereinafter are described the judgment result DB 43 that stores integration test necessity judgment results derived from integration test necessity judgment formulas, and the search DB 44 used for the search through the judgment result DB 43.

FIG. 5 is an explanatory diagram illustrating the structure of the judgment result DB 43. As shown in FIG. 5, the judgment result DB 43 is configured to store target combination patterns, integration test necessity judgment results, and test results, corresponding to identification numbers (shown in the column of No.) for identifying a combination pattern of software components targeted to an integration test. Each integration test necessity judgment result shows a result of an integration test necessity judgment, as derived using an integration test necessity judgment formula, of a target combination pattern. Further, each test result shows a result of a separately conducted integration test (description is omitted). However, each test result here is ensured to be stored in the form of an address at which the result is stored.

FIG. 6 is an explanatory diagram illustrating the structure of the search DB 44. As shown in FIG. 6, the search DB 44 is configured to store inverted indexes of software components, each corresponding to a software component targeted to an integration test.

Each inverted index is generated according to the data registered in the judgment result DB 43. Specifically, each inverted index is generated for a software component, as a set of all of the identification numbers designated to the target combination patterns that include the software component in question.

More specifically, once the inverted index of a software component of interest (interested component) is referred to, information indicative of the location (i.e., memory area numbers) in the judgment result DB 43 is ensured to be fully specified, the information being of the target combination patterns that include the interested component.

When the judgment result DB 43 is actually searched through using the search DB 44, the following steps are taken.

First, inverted indexes are extracted from the search DB 44, for all the software components that configure the target combination pattern to be searched.

Then, a logical product of the extracted inverted indexes is calculated. Specifically, as far as the same identification number is included in all the extracted inverted indexes, the identification number in question is outputted as a result of the calculation of a logical product.

When the result of the calculation of a logical product is null (not a single identification number is outputted), it means that the searched target combination pattern is not registered in the judgment result DB 43. On the other hand, when the result of the calculation of a logical product is not null, it means that the searched target combination pattern is registered in the judgment result DB 43. In this case, searching the resulted identification number, the information regarding the integration test necessity judgment result and the test result can be located.

Advantages

As described above, the apparatus 1 for judging the necessity of performing an integration test makes use of the specific judgment formula $IS(C_{ij})$ generated for each software component $S_{ij}$. Specifically, the specific judgment formulas of all the software components targeted to an integration test are logically combined to generate an integration test necessity judgment formula. Based on the integration test necessity judgment formula, the necessity of performing an integration test is analytically judged. Thus, irrespective of the number of software components to be tested or the complexity of the relationship between the software components, a result of an integration test necessity judgment is easily obtained using a simple logical calculation.

Further, an integration test is carried out according to the result of the integration test necessity judgment. Accordingly, a unnecessary integration testing does not have to be carried out for a combination pattern in which those software components which would never be concurrently selected are combined, from the viewpoint of the specification. This can reduce the time and effort that would be involved in formulating core assets.

Further, according to the apparatus 1, integration test necessity judgment results and integration test results are stored in the judgment result DB 43, corresponding to respective combination patterns to be tested. In addition, judgment results in the past are ensured to be easily searched using the search DB 44. This can prevent duplicating a judgment or test for a combination pattern that has already been judged or tested.

Modifications

An embodiment of the present invention has been described so far. However, the present invention shall not be limited to the embodiment described above but may be implicated in various modification.

For example, in the above embodiment, corresponding information is acquired from the core asset DB 41 that configures the memory section 4. Alternative to this, for example, corresponding information may be acquired from an external memory unit, not shown, or may be acquired from a server on a communication network, such as Internet.

In the embodiment described above, the apparatus 1 includes the judgment result DB 43 and the search DB 44. However, these databases may be omitted. In this case, when a judgment result is derived from an integration test necessity determination formula, an integration test may be immediately carried out according to the judgment result.

The present invention may be embodied in other specific forms without departing from the spirit or essential characteristics thereof. The present embodiments and variations are therefore to be considered in all respects as illustrative and not restrictive, the scope of the present invention being indicated by the appended claims rather than by the foregoing description and all changes which come within the meaning and range of equivalency of the claims are therefore intended to be embraced therein.

What is claimed is:

1. A method of judging whether or not an integration test between or among software components is necessary, the software component being reusable software which can be used as a core asset for a software product line, the method comprising:
    a first step of acquiring corresponding information between a feature, which configures a feature model expressing characteristics of a group of products produced by the software product line, and a type and variations of each of the software components;
    a second step of producing, for each of the software components $S_{ij}$ a set of state variables $C_{ij}$ of all of the features corresponding to the software components $S_{ij}$, by using the corresponding information acquired in the first step,
        where i denotes the types of each of the software components and i=1 to M wherein M is a total number of the types of the software components, j denotes the variations of the software components and j=1 to $N_j$ wherein $N_i$ is a total number of the software component specified by the type i, and the $S_{ij}$ denotes one of the software components which is specified by the type i and the variation j, and
        where each of the state variables $C_{ij}$ is prepared for each of the features and is TRUE when the feature is selected and to FALSE when not selected,
    a third step of producing, for each of the software components $S_{ij}$, a specific judgment formula $IS(C_{ij})$ which is a logical formula composed of a logical product between a logical formula $H(C_{ij})$ and each of $N_i-1$ logical formulas $NH(C_{it})$,
        where $S_{ix}$ denotes a group of the software components composed of $N_j$ software components specified by i,
        where t denotes $N_j-1$ variations which are other than variations specified by j among $S_{ix}$, wherein t does not equal j,
        the logical formula $H(C_{ij})$ is obtained by logical-product combining all elements of the $C_{ij}$, and
        the logical formula $NH(C_{ij})$ is obtained by logically denying the logical formula $H(C_{ij})$,
    a fourth step of designating two or more software components to be subjected to judgment for necessity of performing an integration test; and
    a fifth step of producing a necessity judgment formula by logical-product combining all the specific judgment formulas produced in the third step, for the software components designated in the fourth step; and
    a six step of judging whether or not the integration test is necessary, based on the necessity judgment formula such that the integration test is necessary when the necessity judgment formula is always FALSE and the integration test is not necessary when the necessity judgment formula shows unclearness as to TRUE or FALSE, or always shows TRUE.

2. The method of claim 1, comprising
    an output step of outputting results of the judgment, the results showing whether or not the integration test is necessary.

3. An apparatus for judging whether or not an integration test between or among software components is necessary, the software component being reusable software which can be used as a core asset for a software product line, the apparatus comprising:
- information acquiring means for acquiring corresponding information between a feature, which configures a feature model expressing characteristics of a group of products produced by the software product line, and a type and variations of each of the software components;
- first producing means for producing, for each of the software components $S_{ij}$, a set of state variables $C_{ij}$ of all of the features corresponding to the software components $S_{ij}$, by using the acquired corresponding information,
    - where i denotes the types of each of the software components and i=1 to M herein M is a total number of the types of the software components, j denotes the variations of the software components and j=1 to $N_j$ wherein $N_i$ is a total number of the software component specified by the type i, and the $S_{ij}$ denotes one of the software components which is specified by the type i and the variation j, and
    - where each of the state variables $C_{ij}$ is prepared for each of the features and is TRUE when the feature is selected and FALSE when not selected,
- second producing means for producing, for each of the software components $S_{ij}$, a specific judgment formula $IS(C_{ij})$ which is a logical formula composed of a logical product between a logical formula $H(C_{ij})$ and each of $N_i-1$ logical formulas $NH(C_{it})$,
    - where $S_{ix}$ denotes a group of the software components composed of $N_i$ software components specified by i,
    - where t denotes $N_j-1$ variations which are other than variations specified by j among $S_{ix}$, wherein t does not equal j,
    - the logical formula $H(C_{ij})$ is obtained by logical-product combining all elements of the $C_{ij}$, and
    - the logical formula $NH(C_{ij})$ is obtained by logically denying the logical formula $H(C_{ij})$,
- designating means for designating two or more software components to be subjected to judgment for necessity of performing an integration test; and
- third producing means for producing a necessity judgment formula by logical-product combining all the specific judgment formulas produced in the second producing means, for the software components designated by the designating means;
- judging means for judging whether or not the integration test is necessary, based on the necessity judgment formula such that the integration test is necessary when the necessity judgment formula always shows FALSE and the integration test is not necessary when the necessity judgment formula shows unclearness as to TRUE or FALSE, or always shows TRUE; and
- output means for outputting results of the judging mean, the results showing whether or not the integration test is necessary.

4. The apparatus of claim 3, comprising
memorizing means for memorizing the results judged by the judging means, corresponding to the combinations of the software components, wherein
the output means comprises
memorization determining means for determining whether or not the judgment results for a combination of the software components designated by the designating means have already been memorized in the memorizing means, and
simplified output means for outputting the judgment results for the designated software components, from the memorizing means, without enabling the third producing means and the judging means active, when it is determined that the judgment results for the designated software components are already memorized in the memorizing means.

5. The apparatus of claim 4, comprising search means for searching the memorizing means based on an inverted index assigned to each of the software components, the inverted index consisting of a set of all identification numbers designated to target combination patterns that include a software component in question among the software components, thus the inverted index showing that information indicative of the target combination patterns is stored at which memory area in the memorizing means.

* * * * *

UNITED STATES PATENT AND TRADEMARK OFFICE
CERTIFICATE OF CORRECTION

PATENT NO. : 8,959,487 B2
APPLICATION NO. : 13/938518
DATED : February 17, 2015
INVENTOR(S) : Hiroshi Kuwajima It is certified that error appears in the above-identified patent and that said Letters Patent is hereby corrected as shown below:

In the claims

Col. 10, line 22, claim 1, delete "Sij" and insert --Sij,--;

Col. 10, line 28, claim 1, delete "Nj" and insert --Ni--;

Col. 10, line 42, claim 1, delete "Nj" and insert --Ni,--;

Col. 10, line 43, claim 1, delete "Nj-1" and insert --Ni-1--;

Col. 11, line 16, claim 3, delete "herein" and insert --wherein--;

Col. 11, line 18, claim 3, delete "Nj" and insert --Ni--;

Col. 11, line 33, claim 3, delete "Nj-1" and insert --Ni-1--.

Signed and Sealed this
Third Day of November, 2015

Michelle K. Lee
*Director of the United States Patent and Trademark Office*